United States Patent Office

2,797,208
Patented June 25, 1957

2,797,208

HIGH MOLECULAR WEIGHT DIENEIC POLYMERS AND METHOD OF PRODUCING SAME

Oliver Wallis Burke, Jr., Grosse Pointe Park, Mich.

No Drawing. Application July 9, 1953,
Serial No. 367,090

2 Claims. (Cl. 260—83.7)

The present invention relates to the treatment of dieneic and dieneic-vinyl materials to convert them to resimers and aims to improve and facilitate the conversion process and to produce specifically new products having new and desirable properties.

PROLOGUE

If diene or vinyl monomers are subjected to heating at a temperature of from 250 to 300° C. they undergo exothermal polymerization to low molecular weight materials such as dimers, trimers, and possibly tetramers which are also partially thermally degraded, producing a viscous oily liquid mass of evil odor and unsuitable for any known useful application.

Schmidt et al., U. S. Patent No. 1,901,044, dated March 14, 1933, disclosed that by a special process a hard product that is essentially free from double bonds and has certain desirable characteristics, can be made from certain diene monomers having conjugated double bonds, the product being described by Schmidt et al. as an organic ceramic or resin product. This Schmidt et al., conversion was accomplished by a two step process, by (1st) mass polymerizing the monomer with metallic sodium and (2nd) heating the resultant polymer at a temperature close to 300° C. in order to convert it to the new resinous material.

The Schmidt et al. patent suggested that the mass polymerization step might be catalyzed by certain alleged mass polymerization catalysts other than sodium metal, viz: ozonides, or albumen, or aqueous hydrogen peroxide, but contained no disclosure as to how this might be accomplished, and gave no indication that the products, if so obtainable, would be any different from those obtained when sodium metal mass catalysis was employed.

In my copending application Ser. No. 254,454, filed November 1, 1951, I have disclosed that different and improved resimers may be obtained if, in the first step, instead of polymerizing the material with sodium metal, the polymer is formed by mass polymerization with organic catalysts that dissociate in butadiene to produce alkoxy-, alkyl-, or aryl free radicals. By that method one obtains polymers predominantly of 1,4-configuration as contrasted with the predominantly 1,2-configuration polymers yielded by the sodium metal polymerization. The organo-free-radical polymerization can also produce low molecular weight liquid polymers that can be poured into molds for the subsequent treatment. However, the organo-free radical method of polymerization produced substantial quantities of dimer requiring special precautions to prevent cracking of the material during the heat treatment thereof, and disclosed that the polymers produced by organo-free radical mass polymerizations are difficult to convert to useful resimers.

In further investigation, I ascertained that resimers of desirable hardness and toughness are obtainable from lower molecular weight polymers only with a greater degree of thermal cross-linking than is required when converting higher molecular weight polymers to resimers, and in my copending application Ser. No. 334,359, filed January 30, 1953, disclosed that improved resimers are obtained if, in the first step, instead of mass polymerizing the material with sodium metal or organo free radical catalysts, the polymer is formed by emulsion polymerization procedures that yield polymers not only predominantly of the 1,4-configuration characterizing the organo-free radical mass catalyzed polymers, but also of a molecular weight comparable with that obtained by sodium metal mass polymerization.

PRESENT INVENTION

I have now discovered that a different and still further improved product, and further processing advantage, may be obtained by resimerization of polymers of molecular weights much greater than those employed in the aforesaid procedures, such high molecular weight polymers being obtainable by organo metallic catalyzation and having the predominantly 1,4-configuration in cis- and trans-forms, found advantageous in the lower molecular weight ranges of my copending applications. While in certain respects the process of my application filed January 30, 1953, is of broader applicability than the present process; where the present process is applicable it has many further advantages.

Thus the organo metallic polymerized high molecular weight polymers, when produced at moderate temperatures of polymerization and from dieneic materials that are relatively fresh and free from dimer, like the emulsion produced polymers, contain substantially no volatiles apt to cause cracks and internal pressures during the thermal treatment of the polymer.

Additionally, the high molecular weight organo metallic catalyzed polymers, having molecular weight distributions peaked in the range of from about 1,000,000 to about 10,000,000, attain an initial set of sufficient rigidity to prevent rupture at a much lower degree of cross-linking than the lower molecular weight polymers previously employed. At the same time, however, the gel formed in the initial stages of the thermal treatment is tougher than that obtained from lower molecular weight polymer, and hence more resistant to tearing or fracture, as when being removed from molds for further treatment to free the molds for reuse.

Moreover, with the high molecular weight polymers, only a relatively low degree of cross linking is required to produce a resimer of adequate strength and resistance to thermal and solvent deformation, and since the brittleness increases and the toughness decreases with the increase in density as cross-linking progresses, the less cross-linked resimer of the high molecular weight polymer is a tougher product.

From the foregoing post-discovery analysis, it will be seen that, procedurally, the employment of the high molecular weight organo metallic catalyzed polymer introduces factors that do not merely cumulatively increase the speed of resimerization, but that actually multiply it: e. g. the temperature of cross-linking may be increased more rapidly, thus speeding up the rate of cross-linking; at the same time the amount of cross-linking may be reduced so that the treatment need not be carried so far; and at the same time the tougher states obtained enable demolding operations and like handling procedures to be expedited. Similarly, this post-discovery analysis affords an explanation of why the new resimer products are less shrunken, and tougher, with the same degree of hardness than those obtained by thermal treatment of low molecular weight polymers, and why they exhibit other advantages thereover.

A noteworthy phenomenon for which no explanation has been found is the fact that the employment of polymers of the high molecular weight contemplated by this invention, effects a reduction of mechanical cracking or fracture during the resimerization, especially of large sized pieces, as compared to the fracture experienced with polymers of the molecular weights obtained, with predominantly 1,2-configuration in the Schmidt et al. process, and those obtained with predominantly 1,4-configuration, in the processes of my copending applications.

Furthermore, the present invention enables a resimer for dielectric use to be obtained the equal of or superior to that obtainable from the emulsion polymer, without the difficulties incident to the removal of emulsifier and other contaminants. The alkali-metal components of the catalyst are readily eliminated in the practice of the present invention merely by washing the organo metallic catalyzed polymers with alcohol or water to convert the alkali metal to a soluble salt, and the remaining residues of the catalyst are pure or nearly pure hydrocarbon in nature and introduce no, or only an extremely small proportion of, oxygen into the resimer. For most dielectric uses small quantities of oxygen are not highly detrimental, and even in the case of extreme high frequencies, the minute quantities of oxygen introduced by organo metallic polymerization (especially when the predominant molecular weights of the polymer are carried, before resimerization, to values many times those of previously resimerized polymers, and of the order of 1,000,000 to 10,000,000) are virtually negligible in effect, and even these small quantities of oxygen can be excluded by careful procedure using oxygen-free organo metallic catalysts.

The organo metallic catalyzed polymers employed in the present invention may be used for impregnating laminate forming materials by dissolving the same in a solvent, or may have fillers added thereto, before resimerization, which procedures have been described in connection with the coagulated polymers in my application filed January 30, 1953.

The organo metallic catalyzed polymers may also be frozen and ground to a fine powder with solid carbon dioxide (i. e. Dry Ice) or with liquid nitrogen, and the resulting molding powder may be pressed and heat resimerized, with or without addition thereto of a cross-linking accelerator such as 1 to 5% of an organic peroxide, e. g. benzoyl peroxide, or an organic hydroperoxide, e. g. cumene hydroperoxide, and with or without other additives such as those referred to in said copending application filed January 30, 1953, e. g. fillers such as carbon black or silicon- or titanium-dioxide, abrasive fillers such as silicon carbide; and woven, matted or chopped fibers, such as asbestos or glass fibers.

In particular, since the desired toughness and hardness of the resimer of the present invention is obtainable by cross-linking utilizing less of the unsaturation of the polymer than is the case when the known lower molecular weight polymers are employed, when it is desired to produce an end product of minimum unsaturation for thermal stability, the organo metallic catalyzed polymer may be subjected to partial hydrogenation, partial chemical saturation, or partial cyclization, suitable procedures for which have been referred to in my prior application filed January 30, 1953.

Where coloration is to be avoided, and where extreme high frequency dielectric qualities are required, the products may be prepared with exclusion of oxygen as explained in said copending application, and above.

DIENEIC MONOMERS FOR ORGANO-METALLIC RESIMER PRODUCTION

The monomers that may be converted to resimers by the two step process of organo metallic catalyzed polymerization and subsequent heat treatment in accordance with this invention are herein termed "organo metallic resimer-forming dieneic monomers." These monomers may be itemized as follows, and are subject to certain limitations as noted:

1. Butadiene
2. 1-hydrocarbon substituted butadiene, e. g. piperylene
3. 2-hydrocarbon substituted butadiene, e. g. isoprene, together with other dienes in at least equimolar amount
4. Mixtures of any two or more of items 1 to 3
5. Any of items 1 to 4 with not to exceed an equal weight of vinyl monomer or monomers of the limited class represented by the formula $CH_2:CHR$ in which R is a hydrocarbon radical, e. g. styrene and the vinyl toluenes.
6. Any of items 1 to 4, with not to exceed an equal weight of vinyl monomers of the limited class represented by the formula $CH_2:CR_1R_2$ in at least a molar half of which $R_1$ is hydrogen and $R_2$ a hydrocarbon radical, while in the remainder $R_1$ and $R_2$ may both be hydrocarbon radicals, e. g. styrene with up to an equimolar proportion of alpha methyl styrene

ORGANO-METALLIC POLYMERS THEREOF

For the purposes of this invention the above listed dieneic monomers are polymerized by organo metallic catalysts to form homogeneous or heterogeneous dieneic polymers. The homogeneous polymers, as will be clear from the list, comprise the homopolymers of item 1 or 2, and the copolymers of items 3, 4, 5 or 6, and in the copolymers all the monomeric ingredients are combined and polymerized simultaneously. The heterogeneous polymers comprise mixed polymers corresponding to the copolymers with certain further limitations. In the mixed polymers, separate polymers of certain of the ingredients are formed and subsequently mixed together, at least one of the separate polymers being an organo metallic dieneic polymer as above defined. Therefore, for mixed polymers, the limitation exists that the organo-metallic produced dieneic polymer and the other polymers mixed therewith must be compatible.

It is of course to be understood that the formation of mixed polymers sufficient high molecular weight organometallic dieneic polymer is employed to obtain desired characteristics, and that polymers otherwise produced may be incorporated for special purposes, as for the introduction of polar components that in the present state of the art cannot be introduced by organo-metallic copolymerization without sacrifice of the desired high molecular weight. An example of a polar component is a separately formed copolymer of butadiene and acrylonitrile, and such polar components are desirable where bonding to other materials is desired, e. g. when firm attachment of a paint or other surface coating is contemplated.

ORGANO-METALLIC POLYMERIZATION

The organo-metallic catalysts that yield dieneic polymers of high molecular weights as above defined are limited to the alkali metal compounds of aryl and alkyl hydrocarbons, which may be modified by the addition of activators, or carriers, or modifiers, or solvents, or by other organic materials containing polar constituents such as dioxane or the polar materials employed in the alfin system of catalysts, or various combinations of such modifying addituents; and the term "organo-metallic" as employed herein is to be interpreted in this limited sense.

Alkali metal metalated hydrocarbons of the aryl group are typified by the sodium and potassium naphthyl and methyl-naphthyl derivatives.

Alkali metal metalated hydrocarbons of the alkyl group are typified by the sodium and potassium amyl and alkyl derivatives.

Addition-modified alkali metal metalated hydrocarbons are typified by the alfin type catalysts that employ alkali metal alkoxide together with alkali metalated hydrocarbons, with or without the addition of certain salts such as sodium chloride, sodium bromide, etc.

The preparation of these alfin catalysts is summarized in a recent paper by A. A. Morton, F. H. Bolton, P. W. Collins and E. F. Cluff, which appears in Ind. and Eng. Chem., vol. 44, pages 28–76 to 28–82, 1952, and in publications prior thereto by A. A. Morton and associates, as referred to therein. The remarkably different action of the alfin catalysts as compared to sodium metal and other types of catalysts is set forth with clarity in the paper by A. A. Morton in Ind. and Eng. Chem., vol. 42, page 1488, August 1950, which also states some of the special characteristics of the polymeric materials produced, as such. Any of the recommended alfin catalysts referred to in these publications may be employed to obtain the high molecular weight polymers for conversion to the new resimers in accordance with this invention.

The preparation of the alkali metal metalated hydrocarbons may be effected by generally similar methods, e. g. the alkali metal component may be dispersed in light mineral oil such as petroleum white oil by heating therein above its melting point and homogenizing while cooling to solidify the finely divided metal. The more finely divided the metal, the more finely divided will be the organo-metallic compound formed, and the higher the molecular weight of the polymer produced. It is difficult to determine the role played by possible traces of unreacted alkali metal in the polymerization with organo-metallic catalysts but whatever the effect, these catalysts definitely produce the high molecular weight polymers essential to the realization of the present improvement.

Any suitable means may be employed to aid in maintaining the resulting suspension, such as the inclusion in the mixture of inert solid materials such as salt, silica, carbon black, or other thickening or sludge forming agents, or inert soluble materials such as petrolatum or hydrocarbon waxes. The suspended alkali metal is then converted to the organo-metallic compound by suitable procedures known to the art for forming such compounds. For example, the suspended alkali metal particles in known manner may be reacted with a hydrocarbon halide such as amyl chloride, to form amyl sodium or amyl potassium, that may be used directly as the catalyst. This catalyst may also be converted to other suitable metalated aryl- and alkyl-catalysts, e. g. to the sodium or potassium-naphthalene by simple substitution resulting from addition of naphthalene to the metalated amyl suspension; or to the sodium- or potassium-allyl compound by addition of propylene to the metalated amyl suspension.

For obtaining the high molecular weight polymers essential to the present improvement, the organo-metallic catalysts are generally used in quantities ranging from only a few tenths of a percent to a percent or so of the materials to be polymerized.

The organo-metallic catalysts, as noted, are finely divided solids, and are conveniently handled in a vehicle soluble in the dieneic monomer to be polymerized. For example, this may be the vehicle in which the suspension is formed, which may be a liquid-hydrocarbon carrier thickened with inert material, or a viscous hydrocarbon carrier. The catalyst in such vehicle may be introduced into the monomeric material in a manner to disperse it therein, preferably with little or no agitation. For example, the catalyst in a viscous carrier may be placed in the neck of a bottle that is then partially filled with the monomeric material through a funnel delivering therebelow, and after capping, the bottle may be placed in a protective casing and inverted once or twice to wash the catalyst from the bottle neck. Preferably the heat of polymerization is dissipated by cooling, in the case of bottle preparation, by submerging in a constant temperature bath. The polymerization proceeds with great rapidity from the surface of the catalyst particles, the viscosity rising to high values. On completion of the polymerization, the polymer may be washed on a mill with alcohol, water, or both, to remove the alkali metal components of the catalyst. If the polymer is to be stored before resimerization, it is desirable to add an antioxidant, such for example, as phenyl-beta-naphthylamine, say to the extent of a percent or two.

The polymerization of the dieneic monomers referred to can be conducted at temperatures ranging from −70° to +60° C. Generally, however, satisfactory reaction rates are obtained in forming polymer with organo-metallic catalysts within the range of −10 to +25° C. The polymerization reaction may be conducted in open, closed, or tube reactors. However, it is desirable to exclude both moisture and oxygen.

The polymerization may be conducted with or without solvents for the polymer and to obtain maximum molecular weight it is preferable to use solvents which do not materially modify the organo-metallic catalyst or catalyst system, e. g. hydrocarbon solvents, such as pentane, hexane, decane, cyclohexane, or the like.

The time required for the polymerization depends not only on the temperature, but also on the purity of the monomers, the degree of solvent dilution, and the activity and amount of catalyst used; and to obtain the desired high molecular weight polymers, strenuous agitation should be avoided.

Finally, in forming the mixed polymer, a first high molecular weight dieneic polymer may be formed by organo-metallic polymerization, and one or more additional compatible polymers may be separately formed, that are then intimately mixed with the first. Where a compatible polymer to be added is formed by organo-metallic polymerization and/or in a compatible solvent, the mixture may be effected by mixing the polymer solutions together before separating and drying. Alternatively the first dieneic organo-metallic homogeneous polymer may be separated and dried, and combined with additional polymers by mechanical mixing.

CONVERSION TO RESIMER

When the dried dieneic polymer has been obtained of the desired molecular weight, predominantly above 500,000, and peaked at values of the order of 1,000,000 to 10,000,000 and with its diene components predominantly of 1,4-configuration, it is ready for molding, with or without aid of a solvent, and for heat treatment to convert it to the resimer.

The time and temperature of heating are varied to produce a degree of cross-linking consonant with the desired balance between physical properties, such as hardness and toughness, of the dieneic resimer to be formed. As cross-linking increases, the density of the product also increases and solubility disappears.

The temperature range for the conversion of high molecular weight dieneic polymers to resimers is as a practical matter limited at its lower end by the excessive length of time required at temperatures as low as 250° C. to effect even the reduced cross-linking needed in the present process, and at its upper end by the tendency of temperatures as high as 300° C. or more to cause decomposition of the materials. Temperatures of 260° to 280° C. are suitable and higher and lower temperatures may be employed in certain instances.

Where structural resimers are being produced, the following approximate temperatures and times of heating of the high molecular weight dieneic polymer illustrate suitable conditions, but are not intended to be restrictive of this invention:

| Temperature, ° C.: | Time, hours |
|---|---|
| 225 | 40–400 |
| 250 | 30–200 |
| 275 | 20–100 |
| 300 | 15– 50 |

Resimerizing in desired shapes may be accomplished by holding the polymer in an open or sealed mold with or without external application of pressure while obtaining an initial set by heat treatment, followed by further heat treatment to continue the cross-linking with the shaped article either retained in the mold or removed from it. The desired temperature may be maintained in any suitable way, and form retaining articles removed from molds which may be heat treated, preferably in an inert medium with or without application of pressure or vacuum.

While the invention in its broader aspects has been fully described above, reference will here be made to several typical examples of its complete application to the formation of dieneic resimers from high molecular weight polymers.

*Example I*

PREPARATION OF RESIMERS OF POLYMER PRODUCED BY ORGANO-METALLIC CATALYSIS OF THE ARYL-ALKALI METAL TYPE (a) To 50 grams of butadiene in 250 grams in n-pentane, in a closed vessel is added 1 gram of finely divided sodium naphthalene suspended in several grams of petrolatum, prepared as above described. The vessel is placed in a water bath at 40° C. and removed after one hour. The solvent is evaporated from the liquid mixture and the polymer is treated with 5 grams of isopropyl alcohol to remove the sodium, washed with water, and dried.

(b) The polymer from step (a) is molded, e. g. pressed in a locking mold, and placed in an oven heated to 275° C., for 25 hours, allowed to cool to room temperature in the oven over a period of 12 hours, and removed from the mold.

(c) The resulting product is a hard, nearly transparent, amber tinted solid. This product, because it is virtually free of oxygen or other polar constituents, has excellent dielectric properties, even at extreme high frequencies.

*Example II*

PREPARATION OF RESIMERS OF HIGH MOLECULAR WEIGHT POLYMER OBTAINED BY ACTIVATED ORGANO-METALLIC CATALYSTS OF THE ARYL-ALKALI METAL TYPE (a) To 1000 grams of butadiene, 400 grams of hexane, 20 grams of naphthalene and 14 grams of dimethylglycolether in a closed vessel chilled to —20° C., is added 8 grams of finely divided amylsodium suspended in 20 grams of paraffin oil, prepared as above described, and the vessel is placed in a cabinet refrigerated to —20° C. and allowed to remain overnight. The resulting swollen polymer is washed with alcohol containing 5 grams of phenyl-beta-napthylamine and then with water, and the solvent separated.

The resulting polymer is of greater toughness and tensile strength, and hence of much higher molecular weight than that from Example I, and particularly well suited for avoiding mechanical cracking in the production of large resimer objects. Due to the incorporation of the anti-oxidant it can be stored for considerable periods of time before use.

(b) The polymer suitably molded as a relatively large, thick object, e. g. compressed in a disc shaped locking mold approximately 8 inches in diameter and ½ inch thick, is placed in an oven at 260° C. for 4 hours, removed from the mold and further baked in an oven at 270° C. for 48 hours, and cooled gradually over 6 hours to room temperature.

(c) The resulting object despite its initial exposure to high temperatures and its thickness and relatively large diameter, is free of surface and internal fractures and bubbles. This product is also capable of being mechanically shaped by use of machine tools, for the construction of fabricated parts.

*Example III*

PREPARATION OF FILLER-CONTAINING RESIMERS OF MODERATELY HIGH MOLECULAR WEIGHT POLYMER PRODUCED BY ORGANO-METALLIC CATALYSTS OF THE ALKYL-ALKALI METAL TYPE (a) To 1000 grams of butadiene, 200 grams of styrene and 4000 grams of pentane, in a closed vessel, is added 18 grams of finely divided amylpotassium suspended in approximately 50 grams of petrolatum. The vessel is suitably cooled, e. g. submerged in a water bath at 25° C., for four hours. 15 grams of the antioxidant phenyl-beta-naphthylamine in several hundred grams of isopropanol is thoroughly worked into the swollen polymer and the polymer then washed with water on a wash mill, and dried. The dry polymer is then milled with 600 grams of EPC carbon black. The resultant loaded mass still exhibits relatively high tensile strength and toughness evidencing a higher average molecular weight than that of similar polymers obtained from other modes of polymerization.

(b) The polymer is suitably molded, e. g. pressed between plates in an inert atmosphere (nitrogen) in a compressible plate mold, heated to 270° C. for 40 hours, and allowed to cool to room temperature in the mold.

(c) This material shows particularly good beam strength under static loads and is particularly impervious to attack by corrosive liquids and gases.

*Example IV*

PREPARATION OF RESIMERS OF HIGH MOLECULAR WEIGHT DIENEIC POLYMER OBTAINED BY ALFIN CATALYZATION (a) A one liter flask is charged with 40 grams of butadiene dissolved in 440 grams of dry benzine as solvent for the polymer to be formed. Five grams of allylsodium-sodium isopropoxide suspension in pentane, prepared in known manner, J. A. C. S. 69, 950 (1947), is added to the flask. The polymer forms almost immediately, but the polymerization is preferably continued for thirty minutes at room temperature to complete the reaction. The resultant mixture is poured into alcohol and the alfin butadiene polymer thus isolated. The polymer is freed of alcohol by drying, and is ready for the resimerizing step.

(b) The polymer is milled with about 0.2 gram of cumene hydroperoxide and suitably molded, e. g. placed in a mold of the desired shape and molded under pressure. Heat treatment in the mold at a temperature of 150 to 200° C. is sufficient to produce an initial set in from thirty minutes to two hours, depending on the article concerned. After the initial set the product is removed from the mold and placed in an oven preferably out of contact with oxygen and heated within the temperature range 200 to 300° C. preferably at 275° C. for several days, preferably fifty hours.

(c) This procedure yields a resimer product of high strength, hardness, and mechanical stability, similar to those produced by the foregoing examples.

*Example V*

PREPARATION OF RESIMERS OF HIGH MOLECULAR WEIGHT DIENEIC POLYMER OBTAINED BY ALFIN CATALYZATION AND CONTAINING 2-SUBSTITUTED DIENE (a) A pentane or benzene solution of 20 grams of butadiene and 20 grams of isoprene is added to a one liter four-necked flask, and 25 grams of the alfin catalyst prepared as described in Example IV is added and gently stirred to a uniform mixture. The polymer formed is freed of solvent and traces of the monomers by evaporation. The remaining catalyst is destroyed by washing the product with alcohol and drying.

(b) The resulting polymer is suitably molded, e. g. in a press mold, heated to a temperature of 220° C. for thirty minutes, and the temperature is then gradually elevated to 280° C. over a period of thirty minutes and at this temperature the product is held for two hours or longer depending on the degree of hardness desired for the resimer, about 20 to 100 hours being required to produce a structural resimer that is insoluble and infusible, as set forth preceding Example I.

(c) The product is comparable with that obtained in Example IV and this procedure affords a choice of raw materials.

*Example VI*

PREPARATION OF RESIMERS OF HIGH MOLECULAR WEIGHT DIENEVINYL POLYMER OF THE $CH_2:CHR_1$ TYPE OBTAINED BY ALFIN CATALYZATION (a) 50 grams of butadiene with 20 grams of styrene and 550 grams of pentane is polymerized with 10 grams of the alfin catalyst suspension prepared as described in Example IV, at 50° C. The product obtained after removal of the solvent is washed with distilled water and dried in a vacuum desiccator.

(b) The resultant polymer is then molded in a cavity mold and heated to 250° C. over a period of two hours. After removal from the mold the product is heated forty-eight hours at 275° C. to yield the resimer.

(c) The resultant product exhibits a high degree of toughness and hardness but is somewhat more flexible under stress than the more highly cross-linked resimers composed totally of diene.

*Example VII*

PREPARATION OF GLASS FIBRE REINFORCED RESIMER OF HIGH MOLECULAR WEIGHT MIXED DIENEIC POLYMER OBTAINED BY ALFIN CATALYZATION (a) Butadiene 35 grams and 1,3-pentadiene 35 grams dissolved in 600 grams of heptane is placed in a flask to which is added 10 grams of allylpotassium-potassium allyl oxide alfin catalyst, prepared as described in J. A. C. S. 69, 950 (1947) at 959, and the resultant mixture is allowed to polymerize for forty minutes at room temperature without agitation, a high yield of polymer being obtained. Fiberglass cloth is then soaked in this alfin polymer hexane solution and allowed to dry. The impregnating process is repeated three or four times until the glass cloth contains 20 to 30% by weight of polymer.

(b) The resulting coated cloth is placed in single or multiple layers in a laminating press under a pressure of 1000 p. s. i., and heated for thirty minutes at the temperature of 200° C. The resulting product is removed from the laminating press and placed in a baking oven, the atmosphere of which is kept free of air, and heated for forty hours at 280° C.

(c) In the resulting product the glass cloth is securely bonded in the resimer without detectable evidence of voids or separations.

*Example VIII*

(Modification of Example III)

PREPARATION OF CARBON-LOADED RESIMERS FROM HIGH MOLECULAR WEIGHT DIENEIC POLYMER OBTAINED BY ORGANO-METALLIC CATALYSIS (a) The polymer prepared as in Example I but with carbon loading that may extend up to 100% is calendered into sheet form or extruded into a supporting tube, and may be further surface coated with carbon black or graphite, before conversion to a resimer.

(b) The sheet or tube, with or without carbon coating, is then converted to a resimer under pressure. When the carbon coating is used, it facilitates molding and mold release, and the carbon loading reduces cost, reinforces the product and renders it possible to resimerize with less care without danger of mechanical cracking of the product. When carbon blacks of low structure are used they do not interfere with good dielectric properties at high frequencies, and where conductivity is required, high structure blacks of the conductivity type may be employed.

(c) The resultant products, with or without pure carbon surfacing are particularly suitable for use in contact with strong acids and the like.

*Example IX*

In lieu of forming articles consisting wholly of the resimer or loaded resimer material, as in the foregoing examples, a polymer prepared as in step (a) of any of these examples is calendered onto one or both sides of glass cloth, metal mesh, or other reinforcing laminate materials, and resimerized therein, or the coating of the said materials with the polymer may be effected with the aid of a solvent prior to conversion to a resimer.

*Example X*

For the formation of high speed grinding wheels, the polymer of any of the foregoing examples is loaded with silicon carbide crystals or other abrasive materials in quantities varying up to 150%, and on resimerizing affords a binder for the grinding wheel that is completely inert up to temperatures in the neighborhood of 300° C.

*Example XI*

PREPARATION OF RESIMERS OF HIGH MOLECULAR WEIGHT DIENIC POLYMER OBTAINED USING ALFIN CATALYST FORMED "IN SITU"

To a mixture of butadiene 1000 grams, pentane 3000 grams, amyl chloride 106 grams, isopropanol 18 grams, propylene 29 grams in a pressure container, is added with only mild agitation 23 grams of colloidal metallic sodium in 46 grams of petroleum light oil, thinned with 92 grams of pentane. The resultant dienic polymer is freed of solvent by heating under vacuum and then placed in a locking mold in a press and the mold is closed and locked and heated for one hour gradually to 200° C. The locked mold is then removed from the press and placed in an oven and gradually heated to 280° C. over a period of ten hours which temperature is held for forty-eight hours until the resimer is fully formed.

The resimer so obtained is comparable to that obtained by Example IV, and the method of the present example has the advantage that one does not have to prepare the alfin catalyst as a separate step.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A process for the production of a resin product by thermal treatment of polymeric material, particularly characterized in that moldable polymeric material of molecular weight range predominantly of the order of 1,000,000 to 10,000,000 is thermally treated to convert it into a resin that is insoluble and infusible; said moldable polymeric material having been prepared by polymerization of dieneic material with the aid of a catalyst capable of polymerizing it to such molecular weight range; said dieneic material having been selected from the group consisting of butadiene and piperylene, mixtures of the foregoing, mixtures of the foregoing with not to exceed an equal quantity of isoprene, and mixtures of the foregoing with up to an equal quantity of material selected from the group consisting of styrene and vinyltoluene; said catalyst having been selected from the group consisting of the alkali metal compounds of aryl, alkyl and alkenyl hydrocarbons, mixtures of the foregoing, mixtures of the foregoing with alkali metal halide, and mixtures of the foregoing with alkali metal alkoxide; and said thermal treatment being conducted at temperatures between 250° C. and 300° C. for a period ranging from 15 to 50 hours at 300° C. to from 40 to 400 hours at 250° C.

2. The resinous thermal reaction product of the process of claim 1.

References Cited in the file of this patent

UNITED STATES PATENTS 1,901,044     Schmidt et al.             Mar. 14, 1953

OTHER REFERENCES

Morton: Ind. and Eng. Chem., vol. 42, No. 8, August 1950, pp. 1488–1496.